July 28, 1953  P. ARBEIT  2,646,648
TANK FOR THE MANUFACTURE OF GLASS
Filed April 13, 1949
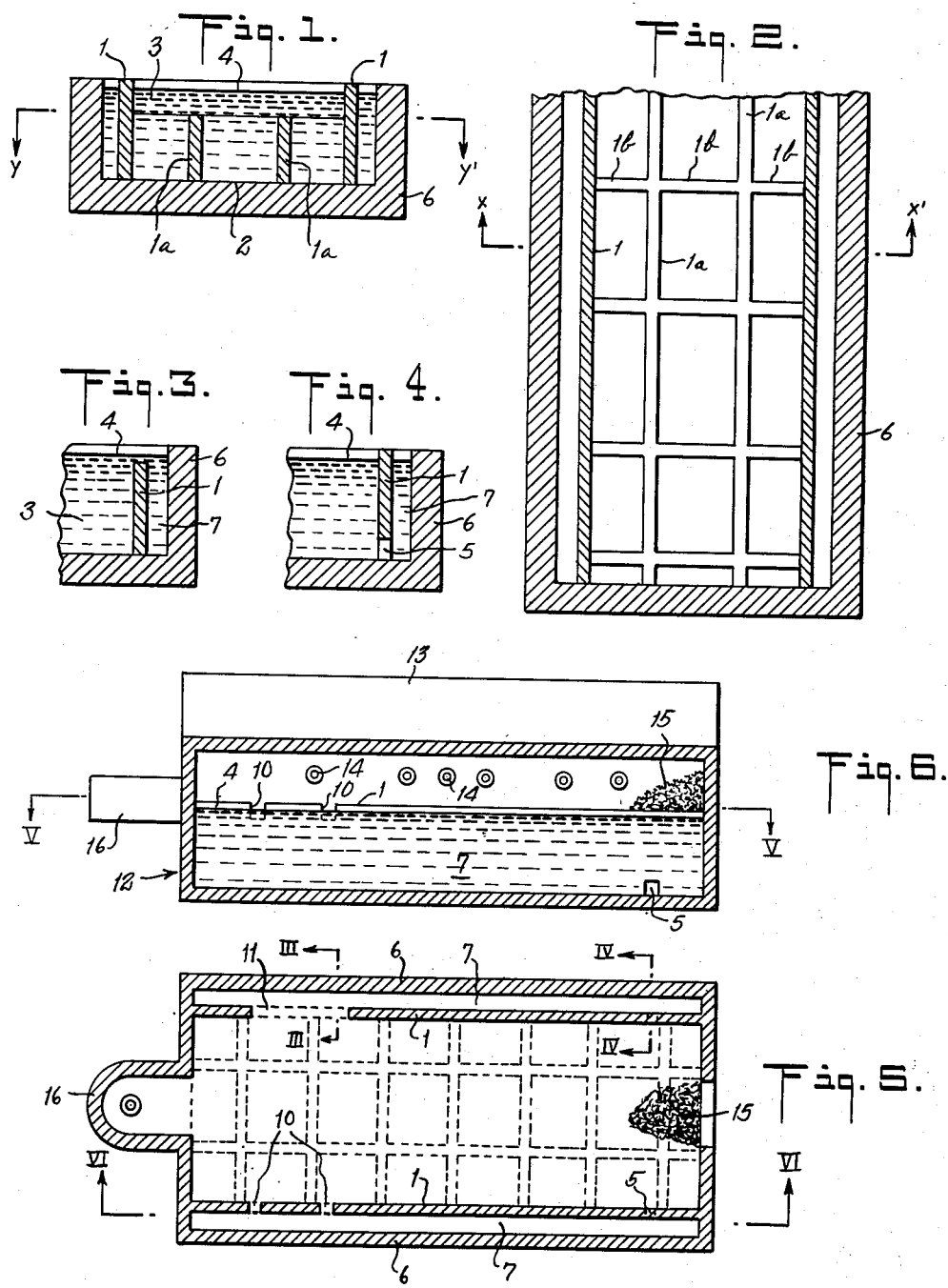
INVENTOR
PIERRE ARBEIT
BY
Dale A. Bauer
ATTORNEY Patented July 28, 1953

2,646,648

UNITED STATES PATENT OFFICE 2,646,648

TANK FOR THE MANUFACTURE OF GLASS

Pierre Arbeit, Paris, France, assignor to Societe Anonyme des Manufactures des Glaces & Produits Chimiques de Saint-Gobain, Chauny & Cirey, Paris, France Application April 13, 1949, Serial No. 87,179
In France April 16, 1948

4 Claims. (Cl. 49—54)

The present invention refers to furnaces for the continuous manufacture of glass. It has for its object an improvement in such furnaces, permitting the glassmaker to reduce, in selected zones of the tank, the convection currents which have a tendency to occur because of the cooling effect of the vertical walls of the tank.

Such convection currents, which tend to be formed naturally as a result of the action of the cold side walls of the tank, may in some cases, and particularly in certain zones of the tank, be objectionable, as they interfere with the control of the circulation of the material in the tank.

This is true particularly in the phase during which the glass is brought from its maximum temperature down to its working temperature, such phase immediately succeeding the phase where gas bubbles are caused to develop and to be released at the surface.

Hitherto, it was considered as desirable to conduct the said cooling phase, upon large areas and masses of glass. I have ascertained that it is not necessary to provide such large glass quantities as is the usual practice if one reduces the formation of convection currents, thus avoiding the resulting mingling of glasses having different physical or chemical properties.

The present invention has for its object an improvement in glass tank furnaces permitting the glassmaker to reduce the convection currents in any desired zone of the tank and particularly in the zone where the glass is brought from its maximum or fining temperatures to its working temperature.

The invention consists in separating, in any desired zone, the glass mass under treatment from the vertical walls of the tank by a molten glass layer interposed between said walls, said layer being established by partitions provided parallel or practically parallel to said walls inside the tank, this glass layer acting as a thermal screen situated between the side walls and the glass mass under treatment.

Such thermal screen affords many advantages over the usual tank building methods where heat insulating material is placed against the walls outside the tank. In case the internal partition becomes deteriorated the mixing of the heat insulating layer with the glass under treatment has no serious inconveniency as this layer is itself glass.

Moreover, as the glass constituting the thermal screen is taken from the glass mass contained in the tank, the temperature difference between the two faces of the internal partition is comparatively small.

Furthermore, as a result of the fact that the thermal screen is constituted by glass, is situated inside the furnace, and has its free level subjected to the radiation inside the tank, it receives a heat flux which raises its temperature and keeps the difference of temperature between the two faces of the internal partition small.

For those several reasons, the heat flux through the partition separating the mass under treatment from the glass layer constituting the thermal screen is considerably reduced.

Consequently, in the mass under treatment there is thus avoided any important cooling of the glass along said partitions which would tend to cause the formation, along said partitions, of downward glass currents originating objectionable convection movements.

In some cases, in order to maintain sufficiently small the temperature difference of the glass situated on either side of the partition, it may be advisable to feed the glass layer constituting the thermal screen with hot glass withdrawn at the surface from the mass under treatment, through communication orifices placed at the upper part of the partition, but under the condition that the cooled glass of said layer will not go back into the mass under treatment except into the colder zone of same, that is to say towards the batch filling zone. The speed of circulation of the glass of the layer constituting the thermal screen which in all cases must be just sufficient for bringing into said layer the calories necessary to maintain a small temperature difference between the two faces of the partition, is controlled by the size of the communication orifices and by the distance between the partition and the corresponding side wall.

The small difference of temperature maintained on the two faces of the partition permits to use, for constituting such partition, materials of high refractory quality, high resistance to the action of the molten glass, and a certain heat-conductivity. Exemplary of such are cast refractories, and carbon or graphite for entirely submerged partitions or for submerged parts of same.

In certain zones of the tank and more especially in the zone where the glass is brought from its maximum temperature to its working temperature, there may be provided, in combination with the above described partitions and between same, additional vertical partitions standing from the bottom of the tank up to a rather important height in comparison with the bath depth, for instance, 60 or 90%, so that the movements of the glass in the mass under treatment will affect only a comparatively shallow layer at the bath surface, thus again reducing the importance of the convection currents.

Such additional partitions may be arranged according to any embodiment that immobilizes the glass of the lower layers which, then, will act as an internal insulating material on the bottom of the tank.

Several ways of carrying out the invention are hereunder described merely as non limitative examples, referring to the attached drawings, where:

Fig. 1 is a vertical cross section of the tank on the line X—X' of Fig. 2.

Fig. 2 is a partial horizontal section on the line Y—Y' of Fig. 1 of said tank.

Figs. 3, 4 are partial views of the tank, in vertical cross section and taken on lines III—III and IV—IV, Fig. 5, respectively, representing other dispositions.

Fig. 5 is a longitudinal horizontal section through a glass furnace on the line V—V of Fig. 6.

Fig. 6 is a longitudinal vertical section on line VI—VI of Fig. 5.

Glass furnaces of continuous type are internally heated, covered tanks the tops of which are generally curved to act as reflectors and to radiate heat down upon the glass. The natural thought would be that all the glass in the furnace is at the same temperature or at least that all the glass in each zone is at the same temperature, but this is unfortunately not the fact and the unequal temperatures existing in the furnace are responsible for imperfections in the product. One of the main causes of unequal temperature is the chilling effect of the furnace walls. This invention is designed to counteract that effect and to attain more even temperature in the glass undergoing manufacture in continuous flow furnaces.

In the drawings the tank 12 has a vault 13 which radiates heat down upon the glass, burners 14 which are grouped to suggest different temperatures at different longitudinal parts of the furnace, a place for the admission of batch, and a forehearth 16 for the delivery of finished glass.

As shown in Figs. 1 and 2, vertical partitions 1 parallel to the side walls 6 of the tank are standing from the bottom 2 to a higher level than the bath 4. Such partitions delimit, between the mass under treatment 3 and the side walls 6 of the tank, a glass volume 7 which is practically not subjected to the general flowing movement of the glass mass 3 under treatment. Such glass volume 7 constitutes, in respect to the glass mass 3, a thermal screen. The thermal screening effect obtained by the glass layer retained between the partitions and the walls depends, among other factors, upon the thickness of said layer and consequently upon the distance from said partition to the corresponding wall. Such thickness may be varied in the different regions of the tank according to the importance of the effect it is desirable to achieve in each region.

An advantageous embodiment, which is particularly suitable for the zone where the glass is brought from its maximum temperature, to its working temperature consists in providing a communication at the upper part of the partition, such partition standing up at that part of the furnace to a level slightly lower than the bath level, as shown in Figs. 3 and 5 at 11. Instead of having a communication extending over all the length of the partition, it is possible to provide only in some places, orifices 10 in the neighbourhood of the bath surface. In Figs. 4 and 6 are shown a communication 5 situated at the lower part of the partition in the cold zone of the tank, i. e. towards the batch filling zone, so as to bring back into the mass under treatment the glass cooled by its contact with the external walls, when and as such glass is replaced by hot glass coming from the surface through the communications provided at the upper part as shown in Figs. 3 and 6.

It may be advantageous, as aforesaid, to complete the arrangement by providing, as shown in Figs. 1 and 2, intermediate vertical partitions, which are longitudinal (1a) and transverse (1b), standing up from the bottom to an important height in respect to the bath depth, while being lower than the glass bath. Between such partitions, there are delimited cavities of such small volume that the glass contained therein will be comparatively immobilized. The movements of the mass under treatment are then limited to a shallow layer at the bath surface, thus reducing to a greater extent the importance of the convection currents.

What is claimed is:

1. A tank furnace for the continuous manufacture of glass comprising, in at least one zone of the furnace, partitions parallel or substantially parallel to the side walls of the tank and delimiting between each partition and the corresponding side wall a glass layer acting as a thermal screen between the glass mass under treatment and said side walls, said partitions having communicating means in the upper level providing for the passage of hot glass from the glass mass under treatment to the glass layer, and being provided at a lower level and in a colder zone of the tank with other communication means allowing the cooled glass of the layer to mingle with the glass mass under treatment.

2. A tank furnace for the continuous manufacture of glass comprising, in at least one zone of the furnace, partitions parallel or substantially parallel to the side walls of the tank delimiting a glass layer acting as a thermal screen interposed between the glass mass under treatment and said side walls, and other transverse submerged, vertical partitions between the first mentioned partitions standing from the bottom of the tank up to a height of about 60 to 90% of the height of the glass bath so as to determine between them cavities of a volume sufficiently small so that the glass in said cavities will be relatively immovable, ducts in the said parallel partitions in a downstream zone and upper level of the tank, and ducts in said parallel partitions in an upstream zone and lower level of the tank.

3. A tank furnace for the continuous manufacture of glass comprising a tank, partitions in the tank substantially parallel to the side walls thereof establishing a glass layer acting as a thermal screen between the glass mass under treatment and said side walls, said partitions being provided with communication orifices near the surface of the bath in a downstream location, and being provided in a zone of the tank, upstream of an at a lower level than said orifices, with other orifices connecting the said glass layers and the said glass mass.

4. A tank furnace for the continuous manufacture of glass comprising, in at least one zone of the furnace, partitions the submerged part of which is made of carbon and in particular graphite, parallel or substantially parallel to the side walls of the tank and delimiting between each partition and the corresponding side wall a glass layer acting as a thermal screen between the glass mass under treatment and said side walls, said partitions having communicating means in the upper level providing for the passage of hot glass from the glass mass under treatment to the glass layer, and being provided at their lower part and in a colder zone of the tank other communication means allowing the cooled glass of the layer to mingle with the glass mass under treatment.

PIERRE ARBEIT.

References Cited in the file of this patent

UNITED STATES PATENTS

| Number | Name | Date |
|---|---|---|
| 296,227 | Schulze-Berge | Apr. 1, 1884 |
| 698,766 | Voelker | Apr. 29, 1902 |
| 808,804 | Anderson | Jan. 2, 1906 |
| 1,872,477 | Mambourg | Aug. 16, 1932 |
| 1,905,533 | Wadman | Apr. 25, 1933 |
| 2,010,055 | Brown | Aug. 6, 1935 |
| 2,064,546 | Kutchka | Dec. 15, 1936 |
| 2,119,948 | Blau et al. | June 7, 1938 |
| 2,331,946 | Von Pazsiczky et al. | Oct. 19, 1943 |

OTHER REFERENCES

Hodkin et al., "Textbook of Glass Tech," 1925, page 267.